United States Patent [19]

Holt

[11] 4,221,397
[45] Sep. 9, 1980

[54] TRAILER HITCH HEAD HAVING JAWS WHICH BEAR ALL OF THE KINGPIN WEAR

[75] Inventor: Jan D. Holt, St. Charles, Mo.

[73] Assignee: ACF Industries, Incorporated, New York, N.Y.

[21] Appl. No.: 16,262

[22] Filed: Feb. 28, 1979

[51] Int. Cl.³ .............................................. B62D 53/12
[52] U.S. Cl. ................................................... 280/436
[58] Field of Search ............... 280/433, 434, 435, 436; 105/368 S; 248/119 S

[56] References Cited

U.S. PATENT DOCUMENTS

| | | | |
|---|---|---|---|
| 2,469,279 | 5/1949 | Seyferth | 280/435 |
| 3,252,432 | 5/1966 | Hartzell | 105/368 S |

OTHER PUBLICATIONS

ACF Maintenance Manual, Model 5 Trailer Hitch, Published Apr. 1972.

Primary Examiner—John J. Love
Assistant Examiner—Randall A. Schrecengost
Attorney, Agent, or Firm—Henry W. Cummings

[57] ABSTRACT

In a trailer hitch head, the kingpin opening in the top plate is made sufficiently large that, when the jaws are in closed position, the trailer kingpin engages only the jaws. The jaws thus bear the entire load of horizontal impacts to the hitch head. The jaws are made of hardened steel to bear these loads and, in the front portion, the longitudinal extent of the jaws is enlarged to better react loads applied to the rear of the jaws. The jaws are attached to the top and bottom plates of the head with readily removable fasteners whereby, when the jaws become worn, they may be quickly and easily replaced without taking the hitch and the flat car out of revenue service.

9 Claims, 5 Drawing Figures

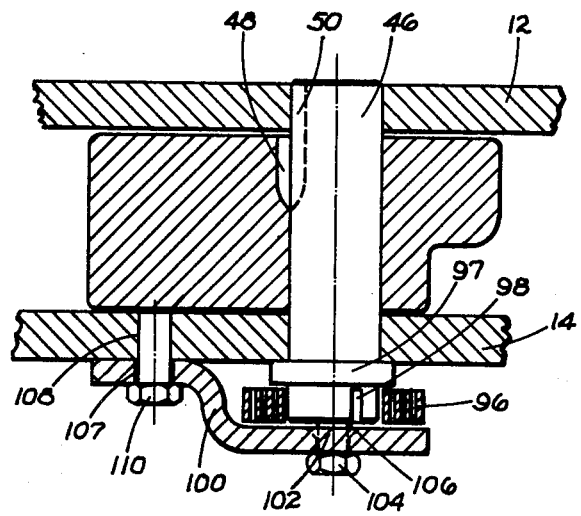
Fig. 2
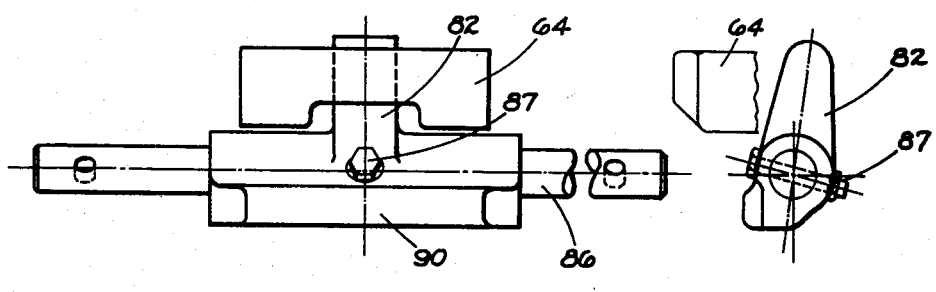
Fig. 4
Fig. 5

TRAILER HITCH HEAD HAVING JAWS WHICH BEAR ALL OF THE KINGPIN WEAR

BACKGROUND OF THE INVENTION

U.S. Pat. No. 3,234,893 assigned to the same assignee as the present application discloses a hitch head having a pair of jaws pivotably mounted on a pair of vertical pins extending between upper and lower head plates. Torsion springs bias the jaws to open position. However, a yoke engages the jaws to hold the jaws in closed position and the yoke is biased into this closed position by a stiff spring. In closed position the jaws hold a trailer kingpin in place.

In this arrangement the jaws bear the load when the kingpin is forced toward the front or open end of the hitch head. However, the top plate opening is dimensioned such that the top plate bears the load when the kingpin engages the rear, or closed end of the hitch head. This same type of head loading is also present, for example, in application Ser. No. 009,334 filed Feb. 5, 1979.

This type of hitch head loading is believed to be the case in other hitch head arrangements such as that disclosed in U.S. Pat. No. 3,632,145.

However, with this type of hitch head loading, the top plate is subject to wear due to the kingpin loads which it must absorb in use.

When the hitch top plate has worn sufficiently that there is danger of kingpin escape, it has been common practice to apply weld metal to the top plate wear surface to return the wear surface to proper dimensions to maintain the kingpin in place. This is a time-consuming operation which generally requires that the flat car be taken out of revenue service for the welding operation. This loss of flat car revenue service time is expensive. See ACF Maintenance Manual, Model 5 Hitch, October 1975, Main and Clark Streets, St. Charles, Mo. 63301. Copy in application file.

It has also been common practice to weld an insert of hard, wear resistant material to the head or to harden the head itself or to locally harden a portion of the head.

In application Ser. Nos. 914,313 filed June 12, 1978 and 949,721 filed Oct. 10, 1978, assigned to the same assignee as the present application, it has been proposed to utilize a hardened steel replaceable insert in the top plate to overcome this wear problem.

However, to accommodate the loads applied by the kingpin to the jaws, the jaws are made of hardened steel.

SUMMARY OF THE INVENTION

In accordance with the present invention, the kingpin opening in the top plate is made sufficiently large that, when the jaws are in closed position, the kingpin engages only the jaws. The jaws thus bear the entire load of horizontal impacts to the hitch head. The jaws are made of hardened steel to bear these loads and, in the front portion, the longitudinal extent of the jaws is enlarged to better react loads applied to the rear of the jaws. The jaws are attached to the top and bottom plates of the head with readily removable fasteners whereby, when the jaws become worn, they may be quickly and easily replaced without taking the hitch and the flat car out of revenue service. In addition, the removable fasteners may be used to tighten torsion springs which bias the jaws into open position.

THE DRAWINGS

FIG. 2 is a sectional view looking in the direction of the arrows along the line 2—2 in FIG. 1.

FIG. 3 is a side elevation view of the hitch head shown in FIG. 1.

FIG. 4 is a view looking in the direction of the arrows along the line 4—4 in FIG. 1 and illustrating the protrusion of the present invention.

FIG. 5 is a side elevation view of the protrusion shown in FIG. 4.

DESCRIPTION OF PREFERRED EMBODIMENTS

Figure 1:
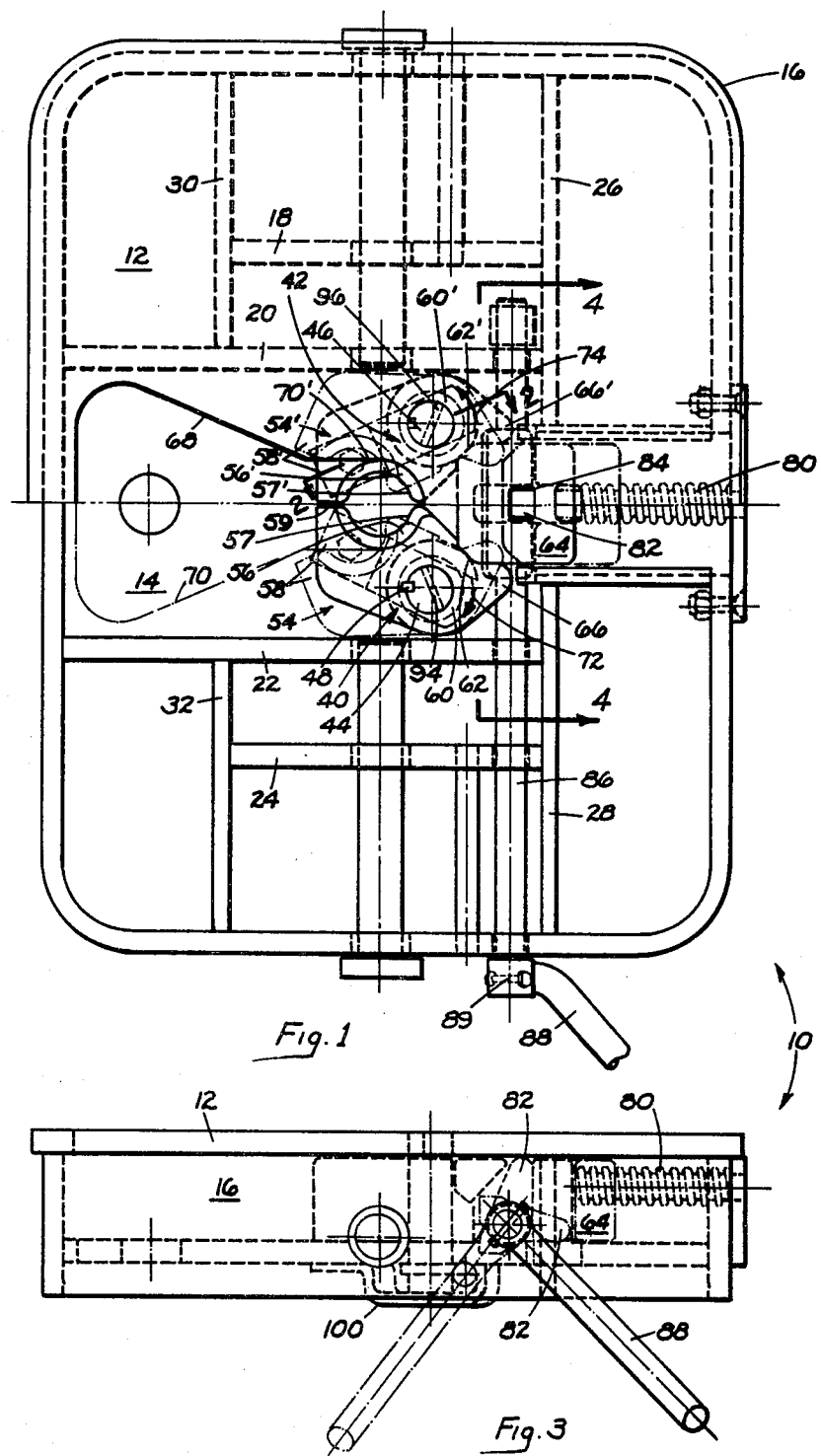
FIG. 1 is a plan view of the hitch head of the present invention with a portion of the top plate removed to illustrate the reinforcing structure for the head.

As is disclosed in application Ser. No. 009,334 filed Feb. 5, 1979, hereby incorporated into the present application by this reference, a hitch head is indicated in the drawings at 10. The head includes a top plate 12 and a bottom plate 14. The top plate includes a depending flange portion 16. Vertical webs 18, 20, 22 and 24 are welded to the top plate and extend longitudinally of the head. Horizontal webs 26, 28, 30 and 32 are also provided which interconnect the vertical webs with the flange portion 16.

A pair of jaws 40 and 42 are connected to respective vertically extending pins 44 and 46 with key slots 48 and 50 and a key 52 (FIG. 2).

The jaws include front portions 54, 54' having generally semi-circular kingpin engagement portions 56, 56'. Front portions 54 are provided with longitudinally extending abutting portions 58, 58'. Abutting portions 58, 58' meet along an abutting surface 59 which extends longitudinally of the head.

The jaws further include rear portions 60, 60'. Rear portions 60, 60' include surfaces 62, 62' which are engaged by a lock block 64 to hold the jaws in closed position, and rear lugs 66, 66' which are engaged by lock block 64 to hold jaws in the full open position as discussed in greater detail in said Ser. No. 009,334 filed Feb. 5, 1979.

Top plate 12 includes a kingpin opening 68 which is tapered inwardly to gather the kingpin in the normal manner. However, the kingpin opening is enlarged at 70 and 70' so that the kingpin only engages the semi-circular jaw surfaces 56 and 56'. In order to avoid the kingpin engaging the rear portion of the opening 70-70', the opening 70-70' should have a diameter of at least three (3) inches. The top plate 12 may thus be made of carbon steel or high strength low alloy steel, such as A572 Grade 50, Type 2, and no insert need be provided in the top plate. A yield strength of the order of 50,000 psi is preferred in the top plate. See pages 63–70 of 1961 *Metals Handbook*, 8th Edition, American Society For Metals, Novelty, Ohio for suitable carbon steels, and pages 87–98 for high strength low alloy steels.

Loads which result in the kingpin engaging the rear portion 57-57' of the jaws tend to pivot the jaws 40 and 42 about the respective pins 44 and 46 in the direction of the respective arrows 72 and 74. This load is then taken out by the front jaw portions 58 and 58' which abut at surface 59. In order to withstand this load, jaws 40 and 42 are made of hardened, heat treated steel such as AISI 4340. See also pages 108–111 of the *Metals Handbook* for other suitable hardenable alloy steels. Jaws 40 and 42 are normally at least one and one-half (1½) inches thick and portions 58–58' preferably extend longitudinally at least about one-half (½) inch to react this load.

Loads applied by the kingpin to the front portion of cylindrical surfaces 56 and 56' tend to pivot the jaws in the opposite directions about pins 44 and 46, and are taken out by lock block 64 through surfaces 62 and 62'.

The loads applied by the kingpin which tend to pivot the jaws about the pins are also transmitted to the pins 44 and 46. The pins are thus also made of hardened, heat treated steel such as AISI 4340, or other suitable steels described on pages 108-111 of the Handbook. The pin loads are then transmitted into top and bottom plates 12 and 14.

Jaws 40 and 42 bear all loads in a horizontal plane and up loads applied by the kingpin, tending to lift the jaws. Down loads are supported by the trailer engaging the upper surface of the top plate.

As is described in greater detail in application Ser. No. 009,334 filed Feb. 5, 1979, lock block 64 is movable longitudinally against the bias of stiff spring 80 by a finger 82 extending through an opening 84 in the lock block. The finger is connected to a transverse shaft 86 by a pin 87. A handle 88 located outside of the hitch head is held in engagement with the shaft by a pin 89. Finger 82 assumes an overcenter position relative to the lock block as shown in FIG. 3 to hold the lock block in open position. When the kingpin exits from the jaws, rear lugs 66–66' engage protrusion 90 (FIG. 4) and pivot the finger 82 from the overcenter position shown in FIG. 3, and allow the jaws to assume a full open position shown in FIG. 1. In this position the lock block engages the rear lugs 66–66' and holds them in this position until another kingpin enters the jaws, engages the jaws and pivots the jaws, and lugs 66–66' move the lock block back, and this allows the jaws to assume the position shown in solid lines in FIG. 1.

Torsion springs 94 and 96 are connected to respective pins 44 and 46 to bias the jaws to open position. As illustrated in FIG. 2, each pin includes a shoulder 97 engaging bottom plate 14, which also defines an upper closing surface for the torsion spring.

Each torsion spring has one end extending into a slot 98 in pin 46 and the other end connected to a torsion spring supporting bracket 100. A pin 102 having a head 104 extends within an opening 106 in jaw pin 46. To tighten torsion spring 96, bracket 100 is pivoted about pin 102 until opening 107 in the bracket aligns with opening 108 in bottom plate 14, at which point threaded fastener 110 is inserted in openings 106 and 108.

Jaws 40 and 42 are readily removed when they become worn by simply removing the fasteners 110 which releases the torsion springs and allows bracket 100 to pivot back to its original position. Pins 44 and 46 will then drop out by gravity. Keys 52 remain in the jaws. The worn jaws are removed through opening 68. A new set of jaws 40 and 42 can then be inserted horizontally through kingpin opening 68. A key 52 is put in place within new jaws 40 and 42. The ends of torsion springs 94 and 96 are inserted into respective slots in jaw pins 44 and 46 and into respective brackets 100. Pins 44 and 46 are aligned with keys 52 in the new jaws. Pivot pins 102 are inserted into jaw pins 44 and 46 and brackets 100 are pivoted about pins 102 until openings 107 and 108 align, and pins 110 are inserted into openings 107 and 108, and the new jaws are ready for operation.

As discussed in Ser No. 009,334 filed Feb. 5, 1979, the hitch head is supported in a conventional manner by a vertical strut and a diagonal strut. As is known to those skilled in the art, the hitch may be tractor operated and raised and lowered between a retractable position on the deck and an operative position by a tractor, or may be manually raised and lowered, for example, by a screw operation. Furthermore, the hitch may be non-retractable and the trailers may be loaded and unloaded with a crane.

It is also within the scope of the present invention to utilize a top plate having a conventional kingpin opening. Initially the top plate will bear some of the kingpin loads until the inner portion of the opening wears sufficiently that the kingpin no longer contacts the top plate, but rather contacts only the jaws. The jaws will then bear all the load. When the jaws become worn, they may be replaced as described above, preferably with hardened steel jaws.

What is claimed is:

1. A trailer hitch head comprising:
a top plate having a kingpin gathering opening; a bottom plate vertically spaced below said top plate; a pair of jaw pins extending vertically between said top plate and said bottom plate; a pair of jaws rotatably mounted surrounding said pins; said jaws having a pair of semi-circular openings located below said top plate opening; said jaws being pivotably between a closed position adapted to engage a highway trailer kingpin and an open position allowing said kingpin to exit; a pair of torsion springs attached to each of said jaw pins which bias said jaws to open position; each of said torsion srings held in place by a torsion spring mounting bracket; each of said torsion springs having a first end attached to an adjacent jaw pin and a second end attached to said torsion spring mounting bracket and wherein said mounting bracket is rotated to a position to tighten said torsion spring.

2. A trailer hitch head according to claim 1 wherein a removable fastener holds said torsion spring bracket in said tightened position.

3. A trailer hitch head comprising:
a top plate having a kingpin gathering opening; a bottom plate vertically spaced below said top plate; a pair of jaw pins extending vertically between said top plate and said bottom plate; a pair of jaws rotatably mounted surrounding said pins; said jaws having a pair of semi-circular openings located below said top plate opening; said jaws being pivotable between a closed position adapted to engage a highway trailer kingpin and an open position allowing said kingpin to exit; a pair of torsion springs respectively biasing said jaws to open position; said torsion springs being held in place by a torsion spring mounting bracket; each of said torsion springs having a first end attached to one of said jaw pins and a second end attached to said torsion spring mounting bracket, whereby said mounting bracket is rotated to a tightened position to tighten said torsion spring; said top plate opening being sufficiently large that said kingpin engages only said jaws when said jaws are in closed position; each of said jaws including front abutting portions which abut each other when said jaws are in closed position; said abutting portions having sufficient length to react loads applied by the kingpin to said semi-circular jaw positions.

4. A trailer hitch head according to claim 3 wherein said abutting portions engage each other along a surface extending generally longitudinally of the hitch.

5. A trailer hitch head according to claim 3 wherein said jaws are made of a heat treatable alloy steel.

6. A trailer hitch head according to claim 3 wherein said top plate is made of a material selected from carbon steel and high strength low alloy steel.

7. A trailer hitch head according to claim 3 wherein said jaws respectively include a pair of rear surfaces engaged by a lock block to hold said jaws in closed position.

8. A trailer hitch head according to claim 3 wherein said jaws respectively include a pair of rear lugs which are engaged by said lock block to hold said jaws in open position.

9. A trailer hitch head according to claim 3 wherein a removable fastener holds said torsion spring bracket in said tightened position.

* * * * *